(12) United States Patent
Kawasaki et al.

(10) Patent No.: US 6,378,264 B1
(45) Date of Patent: Apr. 30, 2002

(54) STRUCTURE BODY AND METHOD OF MANUFACTURE THEREOF

(75) Inventors: Takeshi Kawasaki; Masakuni Ezumi; Masaki Yono, all of Kudamatsu; Toshiaki Sagawa, Yanai, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/572,984

(22) Filed: May 17, 2000

(30) Foreign Application Priority Data

| | | |
|---|---|---|
| May 28, 1999 | (JP) | 11-149133 |
| Sep. 6, 1999 | (JP) | 11-251613 |
| Sep. 14, 1999 | (JP) | 11-259738 |

(51) Int. Cl.$^7$ ................................................ E04C 3/02
(52) U.S. Cl. .................... 52/633; 52/643; 52/690; 52/223.8; 52/223.12
(58) Field of Search .................... 52/633, 690, 692, 52/693, 639, 643, 223.8, 223.12; 14/3, 13, 14

(56) References Cited

U.S. PATENT DOCUMENTS

| | | | |
|---|---|---|---|
| 5,651,154 A | 7/1997 | Ahiskog et al. | 14/6 |
| 5,810,507 A | 9/1998 | Ahiskog et al. | 404/53 |
| 5,901,396 A | 5/1999 | Ahiskog et al. | 14/77.1 |
| 6,050,474 A * | 4/2000 | Aota et al. | 228/112.1 |
| 6,193,137 B1 * | 2/2001 | Ezumi et al. | 228/112.1 |

FOREIGN PATENT DOCUMENTS

| | | |
|---|---|---|
| EP | 797043 A2 * | 9/1997 |
| EP | 0893189 | 1/1999 |
| JP | 9221024 | 8/1997 |

* cited by examiner

Primary Examiner—Beth A. Stephan
Assistant Examiner—Naoko Slack
(74) Attorney, Agent, or Firm—Antonelli, Terry, Stout & Kraus, LLP

(57) ABSTRACT

A hollow frame member is constituted by two face plates 11, 12 (21, 22) joined in a truss shape by ribs 13, 13A, 13B (23, 23A, 23B). End portions of one of the face plates 11 and 21 are positioned in the vicinity of an apex of the truss structure of the hollow frame member. End portions of the other of the face plates 12b and 22b have a projection extending toward the end portions of the face plates 11 and 21. The face plates 12b and 22b are joined by friction stir welding from an upper portion. Next, a connection member 30 is arranged between the ends of the face plates 11 and 21, and from an upper portion the friction stir welding is again carried out. Due to the presence of the ribs 13A, 13B (23A, 23B), the load during the friction stir welding time is easily supported. Since the truss structure is formed totally, a light weight structure with a high rigidity performance can be obtained.

30 Claims, 8 Drawing Sheets

STRUCTURE BODY AND METHOD OF MANUFACTURE THEREOF

BACKGROUND OF THE INVENTION

The present invention relates to a structural body and to a method of manufacturing the structural body. For example, the present invention is directed to a structural body and a manufacturing method in which a structural body is formed by joining extruded frame members made of an aluminum alloy, such as are used in a railway vehicle or a building structure.

Friction stir welding is a method in which, by rotating a round rod (called a "rotary tool") which is inserted into a joint between members to be joined and moving the rotary tool along a welding line of the extruded frame members, the joint is exothermally heated, softened and plastically fluidized, so that a solid-state welding is carried out.

The rotary tool is comprised of a small diameter portion, which is inserted into the welding joint, and a large diameter portion, which is positioned outside of the small diameter portion of the rotary tool, the small diameter portion and the large diameter portion of the rotary tool having the same axis of rotation. A boundary between the small diameter portion and the large diameter portion of the rotary tool is inserted slightly into the welding joint during welding. The above-stated technique is disclosed, for example, in Japanese application patent laid-open publication No. Hei 9-309164 (EP 0797043 A2). In FIG. 9 of this document, a joining of two faces of a pair of hollow extruded frame members is carried out from one of the two faces of the hollow extruded frame members. Further, a coupling member for preventing a deformation of the hollow extruded frame member is shown.

The main difference between friction stir welding and arc welding resides in the fact that, in friction stir welding which involves insertion of a rotary tool into a narrow gap between members to be subjected to welding, a large load is applied to the members being welded. This load acts mainly in the insertion direction (an axial center direction) of the rotary tool. Namely, the insertion force of the tool acts on the members to be subjected to welding. When the hollow extruded frame members are subjected to friction stir welding, the insertion force acts against a rib which connects two parallel face plates, with the result that the hollow extruded frame member may be deformed. For these reasons, it is necessary to form a structure in which a deformation of the coupling member portion can be prevented.

An example of deformation prevention means is disclosed in Japanese application patent laid-open publication No. Hei 9-309164 (EP 0797043 A2). In this document, to a joining portion of the two hollow extruded frame members, a vertical plate (called a "lengthwise rib") for joining two face plates of the hollow extruded frame member is provided. This lengthwise rib is positioned on an extension line of an axial center of the rotary tool. The lengthwise rib is one to which two face plates of the hollow extruded frame member are connected. Since a large load acts concentrically on the lengthwise rib, it is necessary to increase the plate thickness of the hollow extruded frame member. For this reason, there is a difficulty in obtaining a light weight structural coupling member.

Further, this lengthwise rib of the hollow extruded frame member can be considered from another aspect. When an outside bending force acts on the hollow extruded frame member, it is well known that the whole rigidity performance dominated by the rib. To improve the rigidity performance relative to the outside bending force, it is desirable to arrange the rib to have a consistent forty five degree angle relative to the face plate, which is a main stress force perpendicular to a shearing force. However, a lengthwise rib which is perpendicular to the two face plates of the extruded member hardly contributes to the strengthening of the member.

As stated above, regardless of the fact that the lengthwise rib hardly contributes to an improvement of the rigidity performance when the structural body is used as a strengthening member, since this lengthwise rib is necessary to increase the plate thickness of the hollow extruded frame member so as to support the insertion force during friction stir welding, it makes it difficult to achieve a light weight structure of the coupling member of the hollow extruded frame member.

SUMMARY OF THE INVENTION

An object of the present invention is to provide a structural body having a light weight structure and a high rigidity performance, and a method of manufacturing the structural body.

The above-stated object can be attained by a manufacturing method comprising the steps of: preparing two hollow frame members in which two sheet face plates are connected with a truss-shaped structure by plural ribs, an end portion of one of the face plates is positioned in the vicinity of an apex of the truss structure, and an end portion of another of the face plates has a projection extending toward the end portion of the one of the face plates; welding the projected face plates to each other from a side of the one of the face plates; arranging a connection member between the end portion of the one of the face plates of one of the two hollow frame members and the end portion of the one of the face plates of the other of the two hollow frame members; and welding the respective end portions of the connection member to the respective face plates.

The above-stated object can be attained by a manufacturing method comprising the steps of: connecting two face plates of two hollow frame members by plural ribs, and arranging the two hollow frame members so that an end portion of one of the two face plates of one frame member is projected from an end portion of one of the two face plates of the other frame member; welding the projected members to each other from above the two face plates using friction stir welding; and overlapping the respective end portions of one connection member to a connection portion which is formed at one end portion and the rib of the other of the two face plates of said one of the two hollow frame members and to a connection which is formed at one of the end portion and the rib of the other of the two face plates of the other of the two hollow frame members; welding of the one of the two hollow frame members and one end of the connection member at the overlapped portion is carried out from an outer side of the hollow frame member using friction stir welding and the position of the friction stir welding is an inner side position which has a portion not being subjected to the friction stir welding to one end of the connection member; and in a welding of the other of the two frame members and the other end of the connection member at the overlapped portion is carried out from an outer side of the hollow frame member using friction stir welding or the other end of the connection member and the other of the two face plates of the hollow frame member are joined by arc welding, and the position of the friction stir welding is an inner side position which has a portion not subjected to friction stir welding to one end of the connection member.

The above-stated object can be attained by a friction stir welding method comprising the steps of: overlapping one end portion of a first member and one end portion of a second member, the overlapped portion is positioned between another end portion of the first member and another end portion of the second member; and in a state in which a rotary tool is inclined relative to the overlapped portion, the rotary to is inserted into the first member and the second member to carry out a friction stir welding.

DESCRIPTION OF THE INVENTION

One embodiment of a structural body and a method of manufacturing the structural body according to the present invention will be explained with reference to FIG. 1 to FIG. 4.

Figure 4:
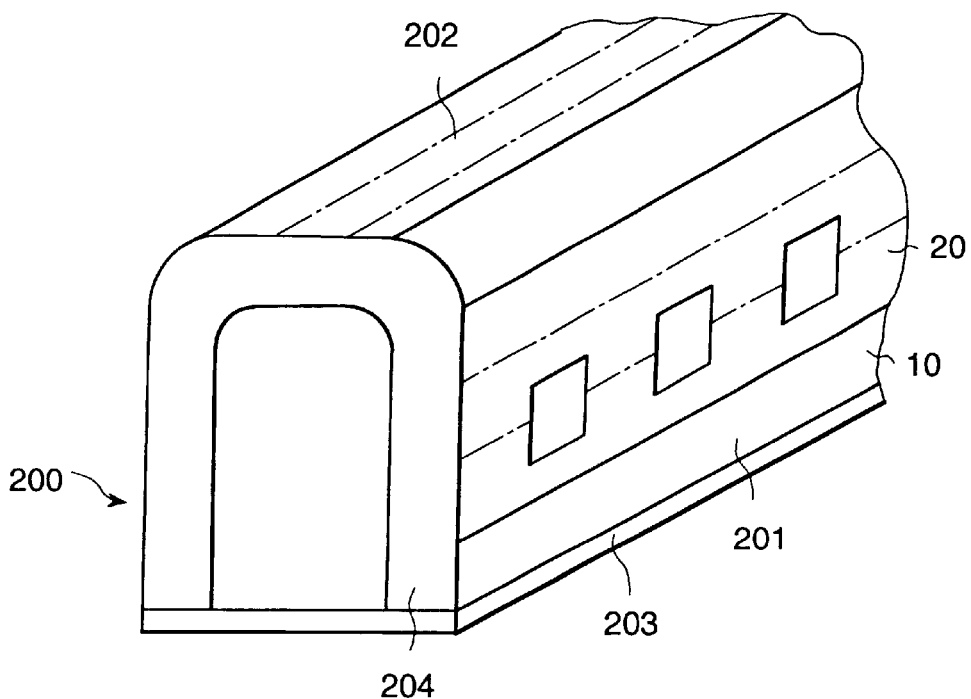
FIG. 4 is a perspective view of a car body of a railway vehicle in which one embodiment of a structural body formed by the manufacturing method according to the present invention is employed.

As seen in FIG. 4, a car body 200 is comprised of a side structure 201 for constituting a side face of the car body 200, a roof structure 202 for constituting a roof of the car body 200, a stand frame 203 for constituting a floor of the car body 200, and an end structure 204 for constituting an end portion of the car body 200.

Each of the side structure 201, the roof structure 202, and the stand frame 203 is constituted by joining plural extruded frame members. The longitudinal direction of the extruded frame member extends in the longitudinal direction of the car body 200. The extruded frame member is a hollow frame member made of an aluminum alloy.

The constitution and method of joining a hollow extruded frame member 10 and a hollow extruded frame member 20 for constituting the side structure 201 will be explained. Other portions and other structures are formed in a similar way and have a similar construction.

Figure 3:
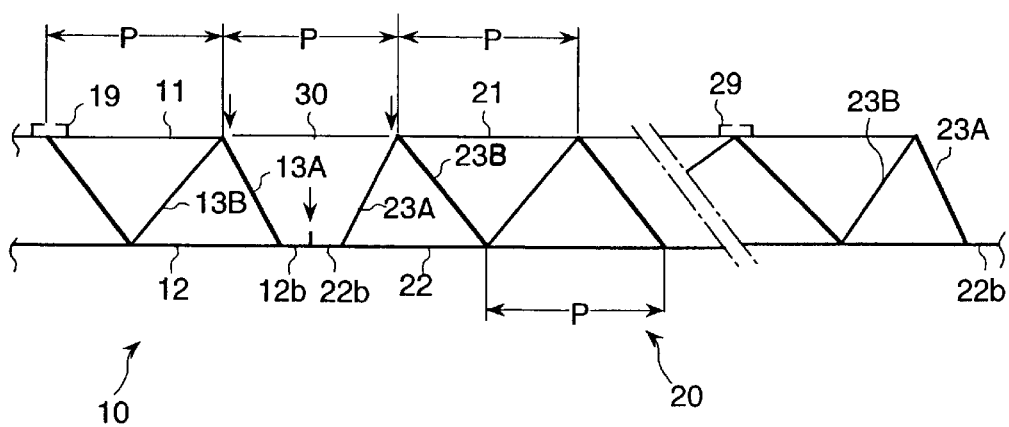
FIG. 3 is a diagrammatic view showing a pair of a hollow frame members.

The hollow extruded frame member 10 and the hollow extruded frame member 20 are comprised of two face plates 11, 12 and 21, 22 and truss-shaped ribs 13 and 23, as seen in FIG. 3. The two face plates 11 and 12 (the two face plates 21 and 22) are disposed substantially in parallel. The pitch of the truss structure formed by ribs 13 and 23 is the same on each of the extruded members. The truss structure constituted by the ribs 13 and 23 has a center line in the direction of the plate thickness of the face plates 11 and 12 and the face plates 21 and 22. An apex exists at a side of the face plates 11 and 12 and the face plates 21 and 22.

In the vicinity of the apex of the truss structure on an inner side of the railway car, rails 19 and 29 for installing equipment and apparatuses are provided integrally. The rails 19 and 29 are comprised of two L-shaped members. The rails 19 and 20 form supports for installing the equipment and apparatuses, such as interior mounting plates and seats, etc.

End portions of the face plates 12 and 22, which are positioned on an outer face side of the car body, project from the end of the adjacent hollow frame members 20 and 10 beyond the face plates 11 and 21. These projecting face plates are indicated by 12b and 22b. By abutting the end portions 12b and 22b of the face plates 12 and 22 against each other, a friction stir welding can be carried out to join the two hollow frame members 10 and 20. The plate thickness of each of the end face plate portions 12b and 22b is thicker than other portions 10 of the face plates 12 and 22.

The end portion of the face plate 11 and the end portion of the face plate 21 on the car inner side are joined through a connection member 30. At the joints where end portions of the connection member 30 and the face plates 11 and 21 abut friction stir welding is carried out to join the inner side of the frame members. The welding of the connection member 30 and the face plates 11 and 21 is located in the vicinity of an apex of the truss structure formed by the ribs 13 and 23, where the apex meets one of the face plates 11 and 21.

Figure 1:
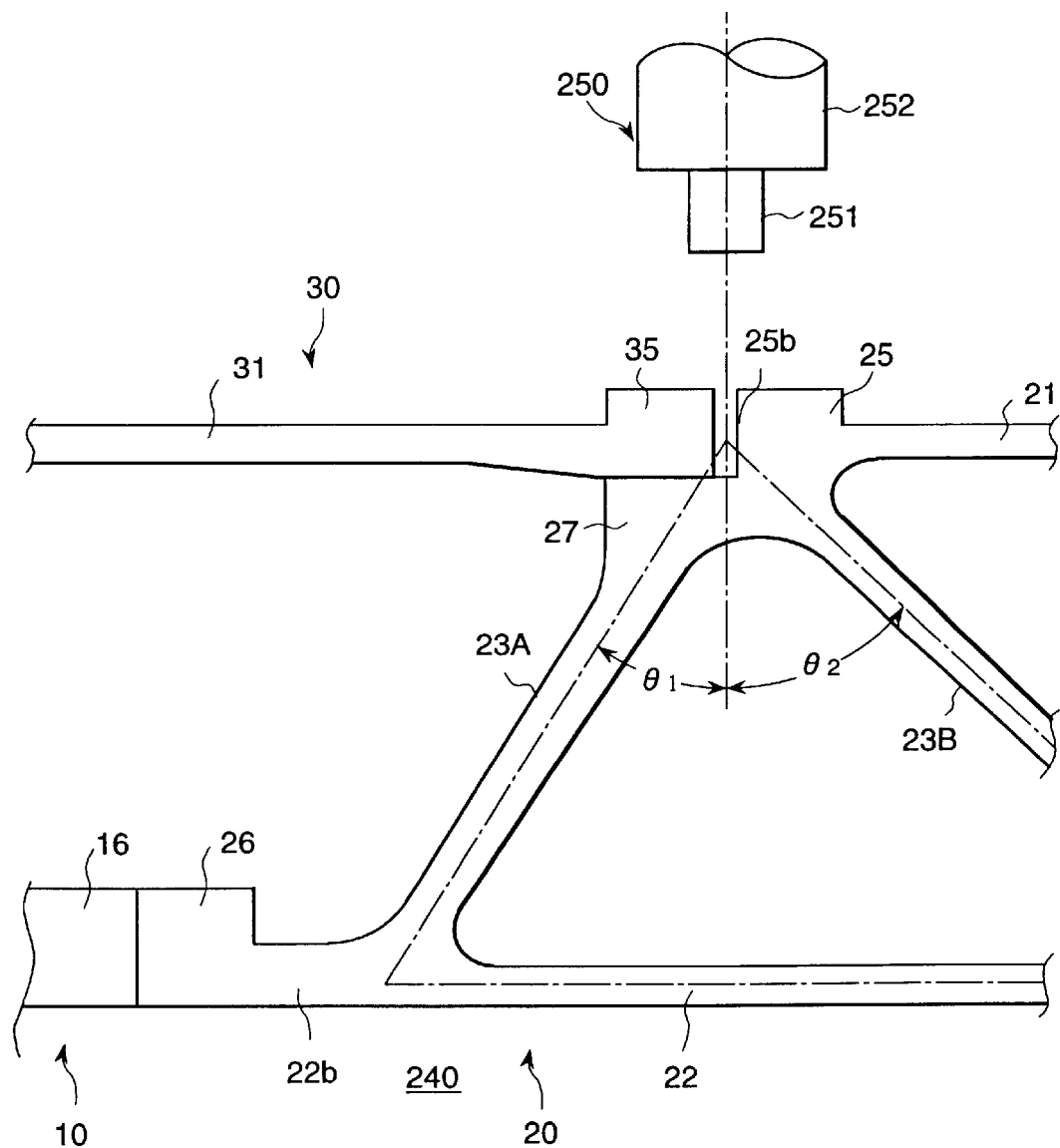
FIG. 1 is a longitudinal cross-sectional view showing an essential portion of a joining portion representing one embodiment of a structural body and a method of manufacturing the structural body according to the present invention.

As seen in FIG. 1, the hollow frame members 10 and 20 are first mounted on and secured to a bed 240 with the face plates 12 and 22 at the bottom in contact with the bed, so that the side formed by the face plates 11 and 21 faces up to comprise an upper portion. The rotary tool 250 is inserted into the welding joint from above, and then friction stir welding is carried out. The friction stir joining is carried out on the portion representing the inner side of the car.

On the projecting end portions of the face plates 12b and 22b, raised portions 16 and 26, which project inwardly (namely, toward the face plates 11 and 21) are provided. In the vicinity of the end portions of the face plates 11 and 21 (namely, at the apex of the truss structure of the end portion), raised portions 15 and 25, which project outwardly (namely, from the outer face side of the face plates) are provided. On each of the end portions of the connection member 30, a raised portion 35 which projects outwardly (namely, from the outer face side of the connection member 30) is also provided. The height and a width of each of the raised portions 15, 25, 35, 16 and 26 are substantially the same.

While the raised portion 15 and the abutted face are not shown in FIG. 1, they are similar to the raised portion 25 and the abutted face 25b provided at the end portion of the face plate 11. The abutting faces 15b and 25b of the raised portions 15, 25 are perpendicular to the plane of the face plates 11, 21. The abutting faces of the end portions of the connection member 30 corresponding to the abutting faces 15b and 25b are also perpendicular to the plane of the face plates 11, 21 and the connection member 30. The end portions of the connection member 30 are mounted on the seats 17 and 27, which are provided the vicinity of the apex of the truss structure. The seats 17 and 27 are disposed above the ribs 13A and 23A, respectively. The vertical faces 15b and 25b and the upper faces of the seats 17 and 27 form a recessed portion which opens toward the face plates 11 and 21 in the end portion of the hollow frame members 10 and 20, providing a support for the end portions of the connection member 30.

The abutted faces 15b and 25b are orthogonal to the face plates 11 and 12, 21 and 22. Namely, the abutted faces 15b and 25b extend along a normal line of the face panels 11 and 12, 21 and 22 in the thickness direction of the hollow frame members and 20.

The abutted faces 15b and 25b are spaced slightly, in a direction away from the end portion of the hollow frame members 10 and 20, from the normal line which passes through the apex of the truss structure, as seen in FIG. 1. In a case where the abutted faces 15b and 25b are provided on the normal line which passes through the apex of the truss structure, if the width of the connection member 30 is short (within a tolerance error), the insertion position of the rotary tool 250 approaches the connection member 30 side. In this case, the widths of the two raised portions 15 (25) and 35 are detected, and the axial center of the rotary tool 250 is positioned to coincide with a center line between the outer sides of the adjacent raised portions.

The lower face (that faces the face plates 12b and 22b) of the end portion of the connection member 30 is tapered gradually in the lower face side so that the end portions of the connection member 30 are thicker than the plate portion 31 thereof The reason why the end portion is made thicker is to allow a thick welding bead to be formed. The plate portion 31 of the connection member 30 has upper and lower surfaces provided on an extension line of the upper and lower surfaces of face plates 11 and 21 of the hollow frame members 10 and 20. Thus, the plate thickness of the plate 31 is the same as the thickness of the face plates 11 and 21. The connection member 30 is made as an extruded frame member of the same material as the hollow frame members 10 and 20. The length of the connection member 30 is the same of the length of the hollow frame members 10 and 20.

As seen in FIG. 3, a distance P from the end of the face plate 11 to the end of the face plate 21 (a distance from the apex of the truss structure at the end of the hollow frame member 10 to the apex of the truss structure at the end of the hollow frame member 20) is the same pitch P of the truss structure at the other positions. Between the face plates 11 and 12, 21 and 22 along the length of the hollow frame members, the truss structure of the hollow frame member forms an isosceles triangle. However, the truss structure located at the ends of the hollow frame members 10 and 20 is not an isosceles triangle.

Figure 2:
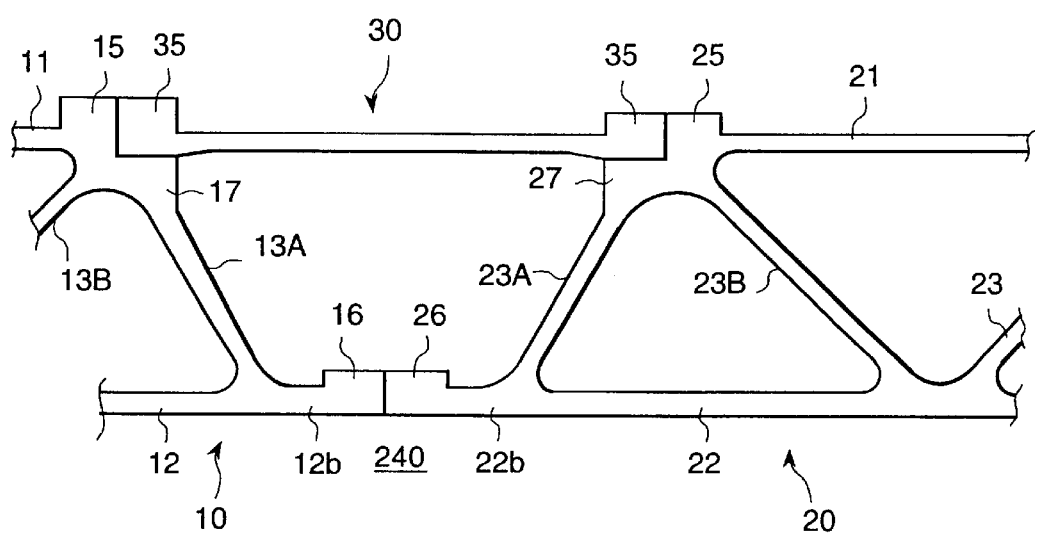
FIG. 2 is a longitudinal cross-sectional view showing a joining portion representing one embodiment a structural body and a method of manufacturing the structural body according to the present invention.

As seen in FIG. 1, the angle of the rib 23A which constitutes the truss structure at the end of the hollow frame members 10 and 20 relative to a vertical line is θ1, and the angle of the rib 23B which constitutes the truss structure at the end of the hollow frame members 10 and 20 relative to a vertical line is θ2. Herein θ1<θ2. Thus, as shown in FIG. 2, the rib 13A is connected to a point midway of the face plate 12 and the rib 23A is connected to a point midway of the face plate 22. Between a connection portion between the rib 13A and the face plate 12 and a connection portion between the rib 23A and the face plate 22, a space for inserting the friction stir joining apparatus is provided.

Since the ribs 13A and 23A are more upright (θ1 is smaller than θ2) in comparison with the ribs 13B and 23B, the plate thickness of the ribs 13A and 23A are made thicker than the plate thickness of the ribs 13B and 23B. Also, the plate thickness of the ribs 13B and 23B is greater than the plate thickness of the other ribs 13. The connection portions between the ribs 13A, 13B and 13 and the face plates 11 and 12, 21 and 22 have an arcuate shape. Further, the thickness of the connection member 30 is determined in accordance with a desired strength.

The end portions (the ends occupied by the raised portions 15 and 25) of the face plates 11 and 21, which are joined to the connection member 30, are each on a perpendicular extension line which passes through the apex of the truss structure formed by the ribs 13A, 13B and 23A, 23B. In FIG. 1 and FIG. 2, the face plates 11, 12, 21, 22 and 30 are horizontal.

The method of manufacturing this structural body will be explained. The hollow frame members 10 and 20 are mounted on and fixed to the bed 240. The abutting end portions 12b and 22b of the face plates 12 and 22 are brought into close contact or, are closely spaced. The-raised portions 16 and 26 of the abutting end portions of the face plates 12 and 22 are temporarily fixed by arc welding from above. The temporary welding is carried out intermittently at spaced positions along the joint between these members. An upper face of the bed 240 on which the abutting end portions 12b and 22b of the face plates 12b and 22b are mounted is flat. Three portions, i.e., the vicinity of the abutted end portions 12b and 22b, a cross-point in the vicinity of the ribs and the abutted end portions 12b and 22b, and a cross-point in the vicinity of the ribs and the face plates 12 and 22, are mounted on the bed 240 having the same height.

Under the above-described conditions, the rotary tool 250 of the friction stir welding apparatus is inserted from above into the joint between the raised portions 16 and 26 and is moved along a welding line, so that friction stir welding is carried out. The axial center of the rotary tool 250 extends in a vertical direction (the direction along a normal line of the welding portion). However, relative to the advancing direction of the rotary tool 250, the axial center is inclined, as already known. The width of the two raised portions 16 and 26 is detected and the axial center of the rotary tool 250 is positioned at the axial center.

As seen in FIG. 1, the rotary tool 250 comprises a large diameter portion 252 and a small diameter portion 251 at a tip end of the large diameter portion 252. During welding, the tip end of the small diameter portion 251 of the rotary tool 250 is inserted into the welding joint to a lower face of the face plates 12b and 22b, and the lower end of the large diameter portion 252 of the rotary tool 250 is inserted to a point between the apex of the raised portions 16 and 26 and the surfaces of the face plates 12 and 22 which face the car inner side (the side facing the plates 11 and 21). The diameter of the large diameter portion 252 of the rotary tool 250 is smaller than the distance between the outer sides of the two abutting raised portions 16 and 26. The small diameter portion 251 of the rotary tool 250 forms a screw member.

According to this friction stir welding, a clearance or gap formed as a welding joint between the abutting end portions of the face plates 12a and 22b is buried and joined. The outer face side (the car outer side) of the abutting end portions is joined to form a flat surface. The outer face side of the face plates 12b and 22b will have no recessed portion at the welding line.

Next, the connection member 30 is mounted on the seat 17 of the face plate 11 and on the seat 27 of the face plate 21, so that the end portion of the connection member 30 comes into contact with or approaches the end portion of the face plates 11 and 21. Then, the raised portions 35 which abut the raised portions 15 and 25 of the face plates 11 and 21 are fixed temporarily by arc welding. The temporary welding is carried out intermittently at spaced intervals along the welding joint.

Next, the rotary tool 250 of the friction stir welding apparatus is inserted into the joint between the connection member 30 and the face plate 11 from above and is moved along the welding line, so that friction stir welding is carried out. The width of the two raised portions 15 and 35 is detected, and the axial center of the rotary tool 250 is guided along the center line between the sides of the raise portions. The axial center of the rotary tool is disposed in a perpendicular plane coincident with the welding line. However, relative to the advancing direction of the rotary tool 250, the axial center is inclined as already known.

For this reason, the axial center of the rotary tool 250 exists on the apex of the truss structure formed by the two ribs 13A, 13B and 23A, 23B or a perpendicular line which passes through the vicinity of the apex. Relative to the eccentricity, it corresponds to the increase of the plate thickness of the ribs 13A and 13B, the shape of the arc for connecting the rib and the face plate, the thickness of the connection portion, etc.

The tip end of the small diameter portion 251 of the rotary tool 250 is inserted deeply to the upper face of the seat 17. The lower end of the large diameter 252 of the rotary tool 250 is inserted to a point between the apex of the raised portions 15 and 35 and the face (the face of the outer side of the hollow frame member 10) of the car inner side of the face plates 11 and 21. The diameter of the large diameter portion 242 of the rotary tool 250 is smaller than the combined width of the two raised portions 15 and 35. The small diameter portion 351 of the rotary tool 250 is a screw member.

Next, the friction stir welding of the abutted portion 35, 25 formed by the connection member 30 and the face plate 21 is carried out in the same manner as already described above for the abutted portion 15, 35.

The welding of the face plates 11 and 21 to the connection member 30 is carried out using the rotary tool 250, which also was used for the welding of the abutted portion 12b, 22b of the face plates 12 and 22. Accordingly, the welding of the face plate 11 is carried out, and then the welding of the face plate 21 is carried out. When two rotary tools are used, the welding of both ends of the connection member 30 can be carried out at the same time.

With the above-stated structure, the welding of both faces of the hollow frame member can be carried out from one side. Accordingly, it is unnecessary to reverse the structural body after one face is welded to weld the other side. As a result, the structural body can be manufactured with a low cost and a high accuracy.

Further, the outer face of the welded joint on the face plates 12b and 22b can be smooth and flat. The raised portions 16, 26, 15, 25, and 35 are provided on the structural body side or the car inner side, but they are not provided on the portions (the outer face side, the car outer side) where a smooth face is required. Further, on the outer face side, there is no recessed portion that has to be filled in or projection which has to be cut off with a rotary tool. Accordingly, further complicated surface processing becomes unnecessary, and to the car body can be manufactured with the low cost.

Further, the insertion force which is applied during the welding of the connection member 30 and the face plate 11 (21) is supported by the two ribs 13A and 13B (23A and 23B), which form sides of a triangle whose apex is aligned with the axial center of the rotary tool 250. For this reason, the bending of the ribs 13A and 13B (23A and 23B) can be restrained. The plate thickness of the ribs 13A and 13B (23A and 23B) can be made thin, so that a light structure can be obtained. Further, the bending of the face plates 11, 21 and 31 can be restrained.

Since the bed 240 for supporting the ribs 13A and 13B, 23A and 23B has a uniform height, the bending of the face plates 12 and 22 can be prevented.

Further, after the friction stir welding, when it is used as a structural body, all of the structural bodies are constituted to substantially have a truss structure. For this reason, the joining portion of the hollow frame members 10 and 20 has a truss structure, so that the face outer bending rigidity performance can be improved and a light weight structure can be obtained.

Further, after the welding, in a case where it is used as a structural body, the structural body is constituted substantially as a truss structure. The joining portion of the hollow frame members 10 and 20 has a truss structure. Accordingly, the face outer bending rigidity can be improved and the light weight structure can be obtained.

Further, since the abutting end portions 12b and 22b of the face plates 12 and 22, the ribs 13A and 23A and the connection member 30 substantially constitute a truss structure, this portion is not weak. However, consideration will be given to the plate thickness.

Further, the inclination angle θ1 of the ribs 13A and 23A with the center line of the welding joint can be formed larger than the inclination angle θ2 of the ribs 13B and 23B. Accordingly, the width of the connection member 30 is large, which makes it necessary to increase the plate thickness, so that the weight increases. This can be used in a case where a large opening is necessary to allow for insertion of the friction stir welding apparatus. When the inclination angles θ1 and θ2 are made the same, an isosceles triangle can be formed. Accordingly, the plate thickness of the ribs 13A and 13B (23A and 23B) can be the same. Further, the plate thickness of the ribs 13A and 23B can be made thinner than that shown in FIG. 1. However, the size of the truss structure of this isosceles triangle is the same as the truss structure of the other portions, so that the width of the connection member 30 can be large.

When the inclination angles θ1 and θ2 of the ribs 13A and 13B, (23A and 23B) are formed to be the same, the truss structure of the end portion can be formed as a small isosceles triangle. The size of the bottom side of the truss structure of this end portion is smaller than the size of the bottom side of the other portions. Accordingly, the distance from the intersection point of the rib 13B (23B) and the face plate 12 (22) to the end portion of the hollow frame member 10 (20) can be small. As a result, the width of the connection member 30 can be formed to be the same as the width of the connection member 30 shown in FIG. 1.

The pitches of all truss structures including the portion including the connection member 30 are the same. The sizes of the truss structures, except for the truss structure of the end portion, are the same. Accordingly, the design of the hollow frame member can be standardized.

The apex formed by the two ribs 13A and 13B (23A and 23B) may be positioned at the outer face side from the face plates 11 and 21.

The faces of raised portions 15b and 25b can be abutted to the end faces of the raised portions 35 of the connection member 30 from the apex formed by the two ribs 13A and 13B (23A and 23B). However, this case depends on the angle θ, the plate thickness, the load of the rib 13A (23A) and other considerations.

Further, the rotary tool 250 can be directed toward the middle of the angle formed by the two ribs 13A and 13B (23A and 23B). The axial center in this case is directed toward the apex of the truss structure.

The welding of the connection member 30 according to the above embodiment is carried out friction stir welding, however the welding may also be carried out using arc welding. In the case of arc welding, since there is no load during the welding, the ribs 13A and 13B (23A and 23B) can be made thin. Further, the welding of the connection member 30 can be carried out intermittently. Further, the welding of the face plates 12b and 22b also can be carried out using arc welding. When the face plates 12b and 22b are joined using arc welding, the welding is carried out to form the welding beads at a rear face, so that it is necessary to cut-off the beads after the welding.

In the above stated embodiment of the present invention, the face plates 11 and 12 and the face plates 21 and 22 are disposed in parallel, but the invention is also applicable to a case where one of the face plates is inclined with respect to the other face plate. With respect to the plate thickness of the ribs 13A and 13B (23A and 23B), the plate thickness on the side of the face plates 11 and 21 is formed to be greater than the plate thickness on the side of the face plates 12 and 22. By forming the rib 13A and 13B (23A and 23B) so that they are thicker on the side of the face plates 11 and 21, during the welding, it becomes easier to accommodate the high temperature.

Figure 5:
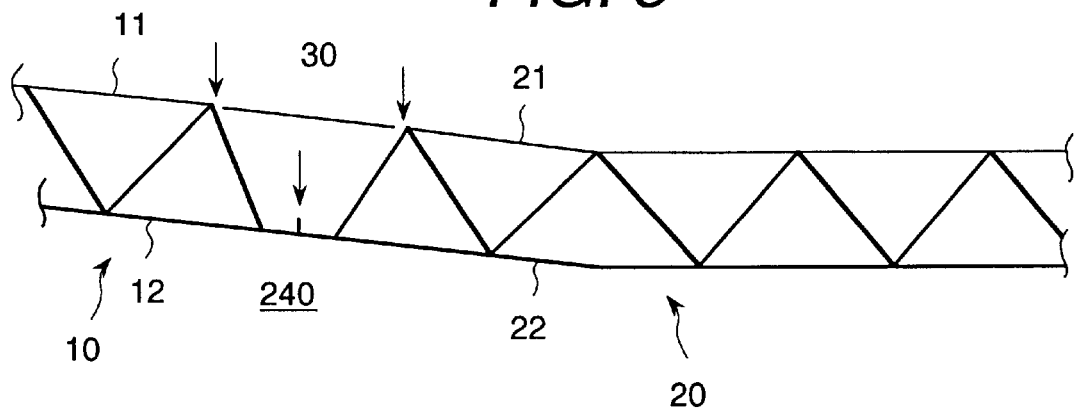
FIG. 5 is a diagrammatic view showing an essential portion of a joining portion of another embodiment of a structural body and a manufacturing method according to the present invention.

FIG. 5 shows a further embodiment of a structural body and a method of manufacture thereof, involving a case in which the normal line of the face plates in the joining portion is inclined. In this regard, one end of the hollow frame member 20 is horizontal and the other end to which the hollow frame member 10 is to be joined is inclined. During welding, the hollow frame members 10 and 20 are mounted on the bed 240. This causes easily to the joining line of the end portion of the side structure 201. The axial center of a rotary body extends along the normal line of the face plate, which normal line passes through the vicinity of the apex of the truss. The arrows show the position and the direction of the rotary tool 250.

Figure 6:
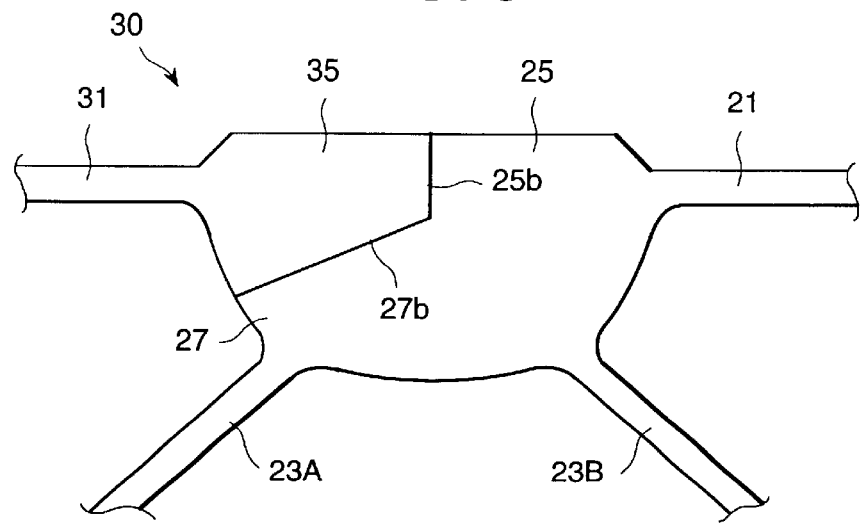
FIG. 6 is a cross-sectional view showing an essential portion of a joining portion of a farther embodiment according to the present invention.

FIG. 6 shows a further embodiment of a structural body in accordance with the present invention. In FIG. 6, the face of the seat 27 for mounting the connection member 30 is formed with an inclined face 27b. The face 27b is inclined downwardly toward the end portion of the face plate 22b. The end portion 35 of the connection member 30 has a corresponding face which is inclined similarly. When the face plates 12b and 22b are joined, the interval between the raised portions 15 and 25 is small. By the provision of the inclined face 27b, the connection member 30 can be mounted more easily.

Figure 7:
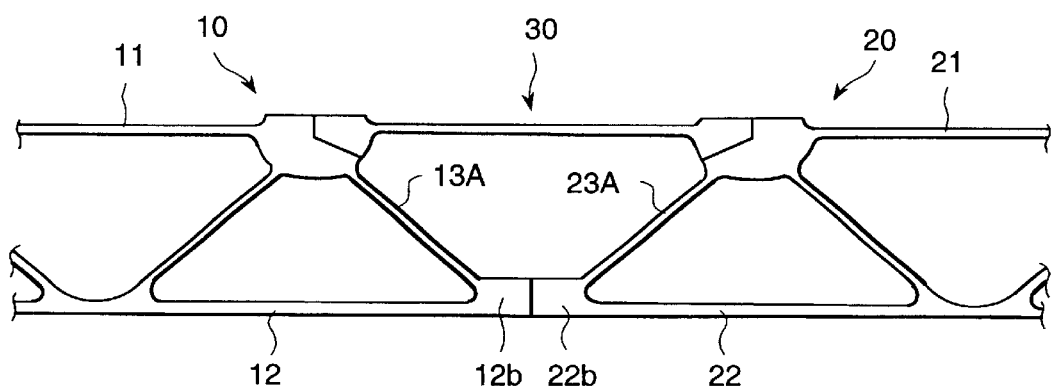
FIG. 7 is a longitudinal cross-sectional view showing an essential portion of a joining portion of a further embodiment of a structural body and a manufacturing method according to the present invention.
Figure 8:
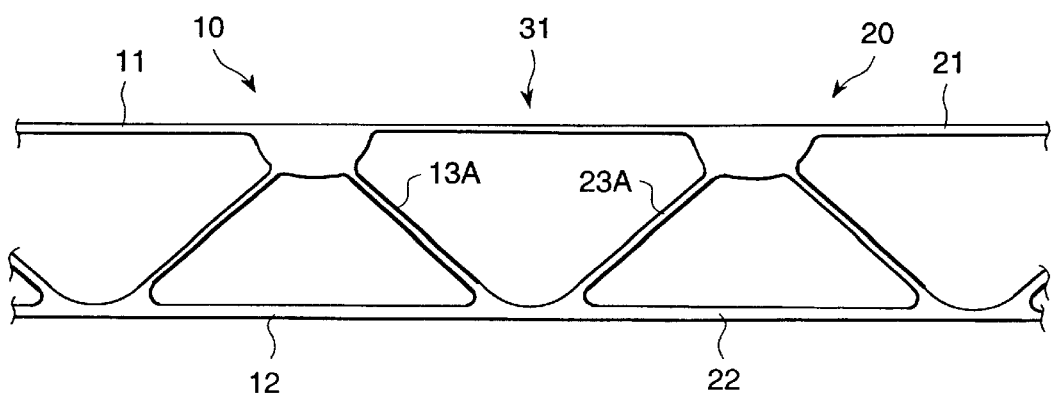
FIG. 8 is a longitudinal cross-sectional view showing an essential portion of a joining portion of a further embodiment of a structural body and a manufacturing method according to the present invention.

Embodiments shown in FIG. 7 and FIG. 8 will be explained. The lengths of the end portions 12b and 22b of the face plates 12 and 22 are short, but they are also thick, as seen in FIG. 7. After the friction stir welding has been performed on the abutting end portions 12b and 22b from the upper portion, the thickened upper parts of these end portions 12b and 22b are cut off from above to provide an arcuate shape, as seen in FIG. 8. This arcuate shape is formed in conjunction with the ribs 13A and 23A. Accordingly, a reduction in the strength due to stress concentration can be prevented.

Figure 9:
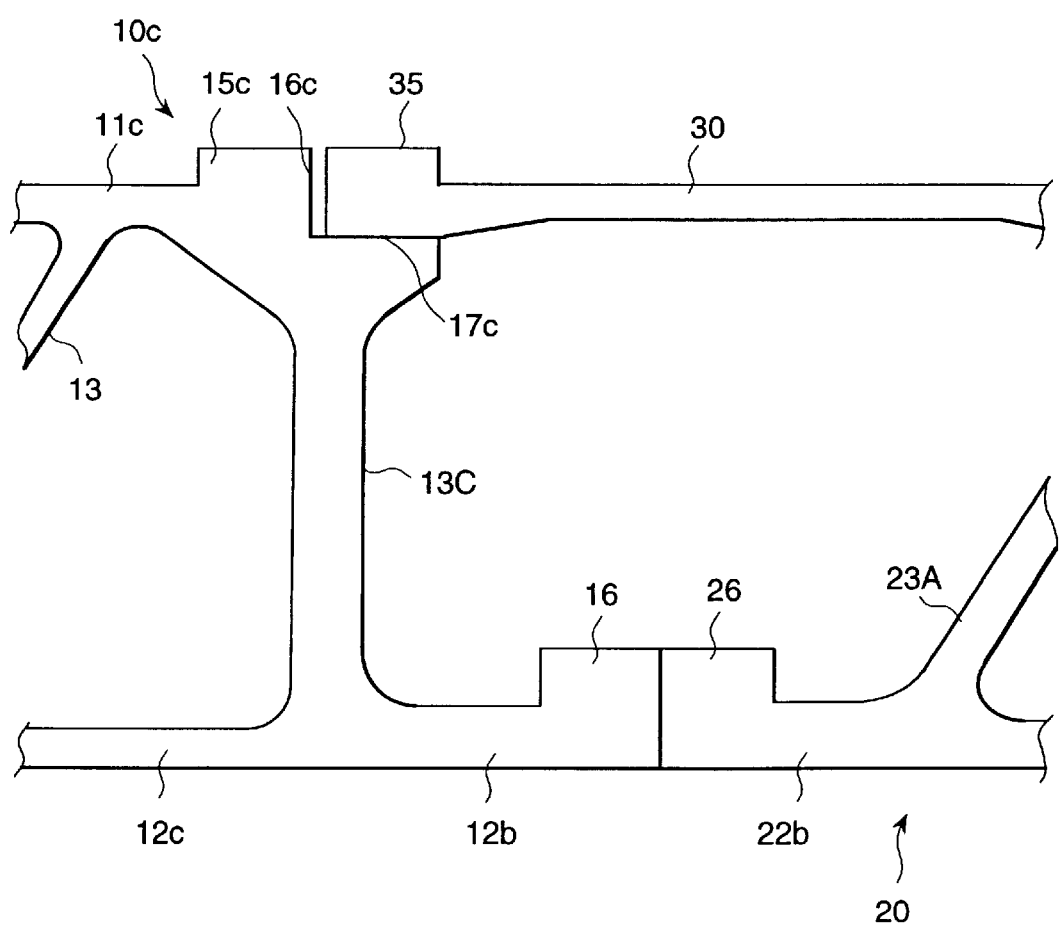
FIG. 9 is a longitudinal cross-sectional view showing an essential portion of a joining portion of a further embodiment of a structural body and a manufacturing method according to the present invention.

An embodiment shown in FIG. 9 will be explained. In this embodiment, the rib 13C at the end of the hollow frame member 10c is orthogonal to the face plates 11c and 12c (extends along a normal line of the face plate). To the connection portion of the face plate 11c and the rib 13C, the recessed portion and the seat 17c are provided similar to the above-stated structure. A projection chip 15c is connected to the connection portion adjacent the seat 17c, on which the end portion of the connection member 30 is mounted. The abutting face 16c of this connection portion is positioned within a range of the plate thickness of the rib 13C. The face 16c extends along a normal line of the face plate. The raised portion 15c is provided at the end portion of the face plate 11c. With this structure, the insertion force during the friction stir welding is supported by the rib 13C. This feature is useful in a case in which at the end portion of the hollow frame member it is impossible to provide a truss structure.

According to the present invention, since the vicinity of the apex formed by two ribs for connecting two sheet face plates is located at the welding portion, a lightweight structure having a high rigidity performance can be provided.

A further embodiment of a structural body and a method of manufacture thereof according to the present invention will be explained with reference to FIG. 10.

Figure 10:
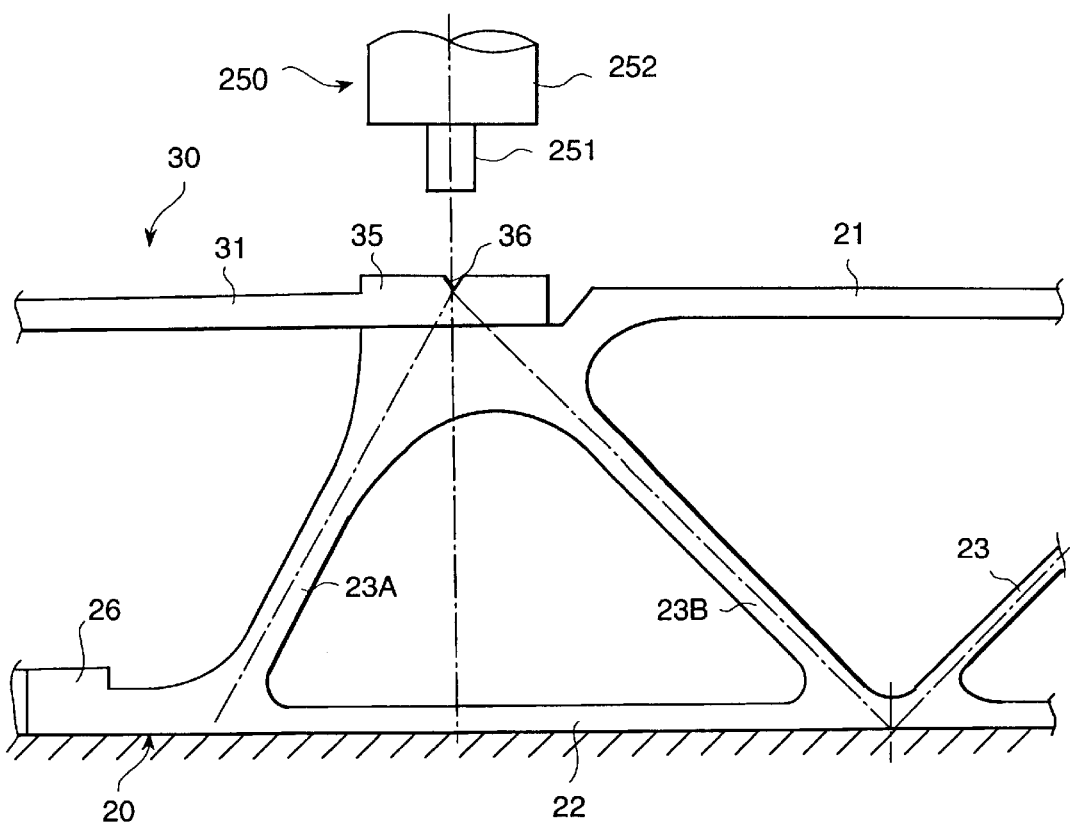
FIG. 10 is a longitudinal cross-sectional view showing an essential portion of a joining portion of a further embodiment of a structural body and a manufacturing according to the present invention.

In FIG. 10, the width of the raised portion 35 is larger than the diameter of the large diameter portion 252 of the rotary tool 250. At the center of the width of the raised portion 35, a groove 36 is provided, and the rotation center of the rotary tool 250 is guided so as to track along the groove 36. A sensor in the friction stir joining apparatus detects the above stated groove 35, so that the rotary tool 250 can be moved along the groove 36. For this reason, in the case of joining of the end portions 12b and 22b of the face plates 12 and 22, the position relationship between the rotary tool 250 and the sensor can be utilized at it is.

A further embodiment of a structural body and a method of manufacture thereof according to the present invention will be explained with reference to FIG. 11.

Figure 11:
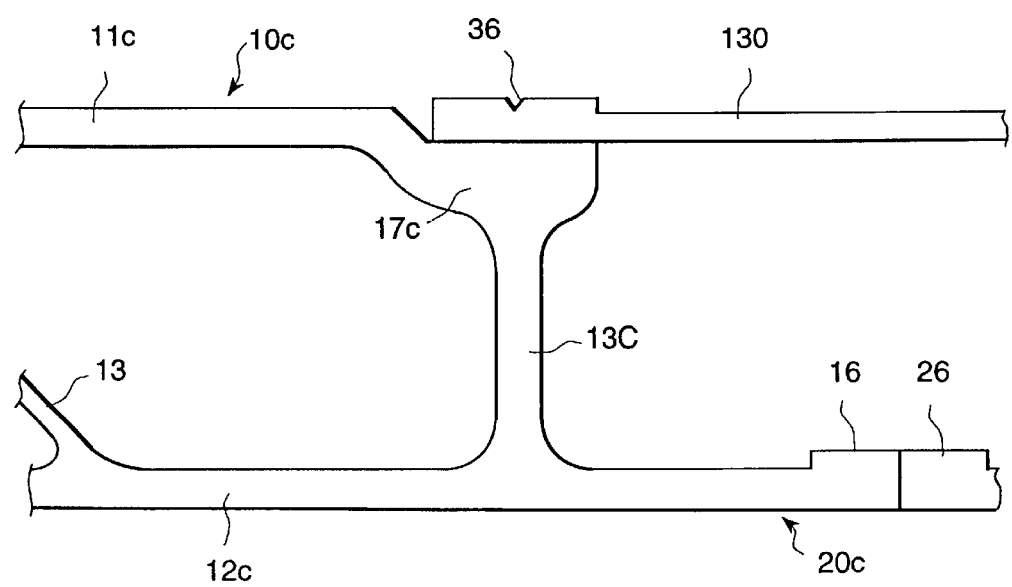
FIG. 11 is a longitudinal cross-sectional view showing an essential portion of a joining portion of a further embodiment of a structural body and a manufacturing method according to the present invention.

In FIG. 11, the rib 13C of the end portion of the hollow frame member 10c is orthogonal to the face plates 11c and 12c (extends along a normal line of the face plate). On the connection portion of the face plate 11c and the rib 13C, the recessed portion and the seat 17c are provided similar to the above-stated structure. The projection chip 17d is connected to the seat 17c, on which the end portion of the connection member 130 is mounted. The rotation center of the rotary tool 250 and the groove 36 are positioned within a range of the plate thickness of the rib 13C. With this structure, the insertion force during the friction stir welding is supported by the rib 13C.

Figure 12:
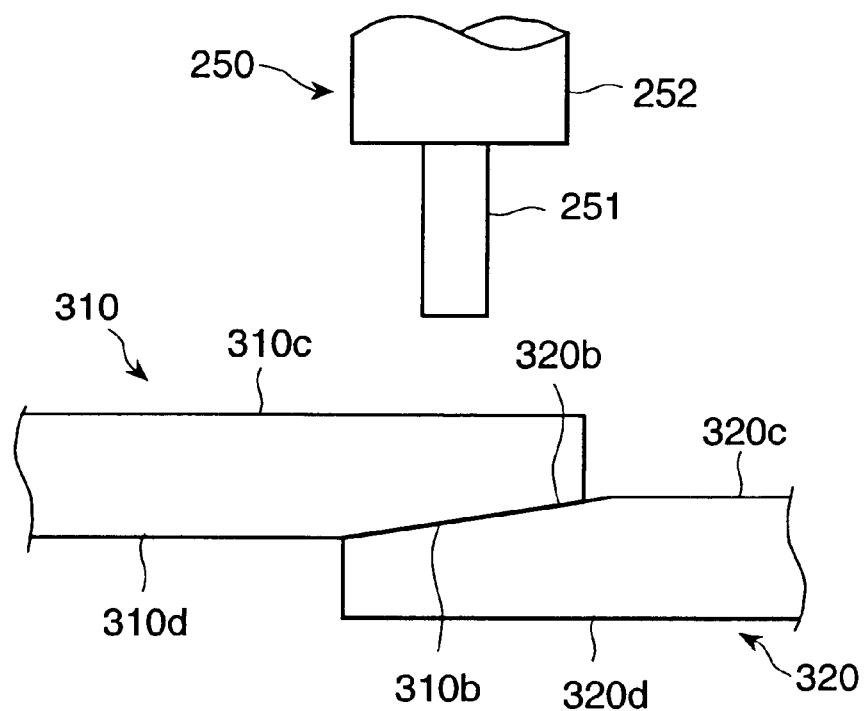
FIG. 12 is a cross-sectional view showing an essential portion of a joining portion of a further embodiment of a structural body and a manufacturing method according to the present invention.
Figure 13:
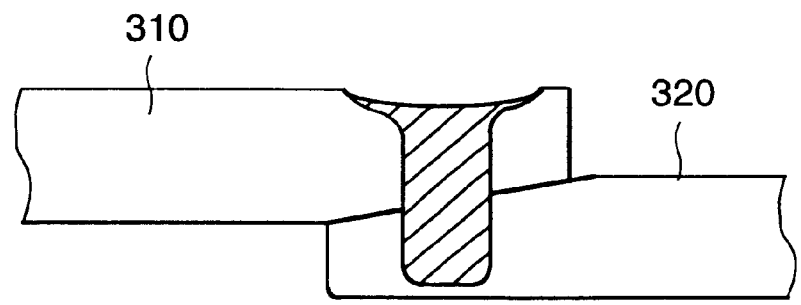
FIG. 13 is a cross-sectional view showing the state of the joint after the welding in FIG. 12.

A further embodiment of a friction stir welding method and according to the present invention will be explained with reference to FIG. 12 and FIG. 13. In this embodiment, a member is used as a strengthened member in which a tensile load acts on a joining portion. In joining two members 310 and 320, the respective end portions are overlapped. The end portion of the one member 310 is overlapped on the end portion of the other member 320. The overlapped faces 310b and 320b are inclined at an inclination angle of, for example, from four angles to ten angles. Other upper and lower faces 310c and 320d (320c and 320d) are disposed in parallel and are horizontal. The lower face 320d of the member 320 is mounted on a bed. The members 310 and 320 are extruded frame members.

The welding line is vertical and extends into the face of the drawing. The overlapped faces 310b and 320b are at a right angle to the welding line (the joining direction). The overlapped faces 310b and 320b are positioned between the end portions of the two members 310 and 320. A rotary tool 250 is moved relative to the members 310 and 320 during welding.

The rotary tool 250 comprises the large diameter portion 252 and the small diameter portion 251 disposed at a tip end of the large diameter portion 252. The small diameter portion 251 of the rotary tool 250 is inserted deeply into the overlapping faces 310b and 320b to near the lower face 320d. The lower end of the large diameter portion 252 of the rotary tool 250 is inserted slightly into the upper face 310c of the member 310. FIG. 13 shows the condition after the welding is finished. The hatched portion represents a welding bead (a heat affected portion). The size of the welding bead is a little larger than the outer diameter of the rotary tool 250.

According to the structure described above, the rotation axis of the rotary tool 250 is vertical, however the overlapped faces 310b and 320b are inclined relative to the horizontal and are inclined relative to the axial center of the rotary tool 250. Also, the overlapped faces 310b and 320b are inclined relative to the rotation direction of the rotary tool 250. For this reason, the members 310 and 320 are stirred and mixed according to the inclination angle of the overlapped faces 310b and 320b.

Namely, in the axial center direction of the rotary tool 250 the material of the members 310 and 320 is mixed. Accordingly, even before the weld an oxide covering film is formed, so that a good mixing is carried out. For this reason, even if the members 310 and 320 are pulled in a right and left direction as seen in the drawing, a weld of high strength can be obtained. Accordingly, the members 310 and 320 can be used as a strengthening members which has a high longitudinal tensile strength.

Figure 14:
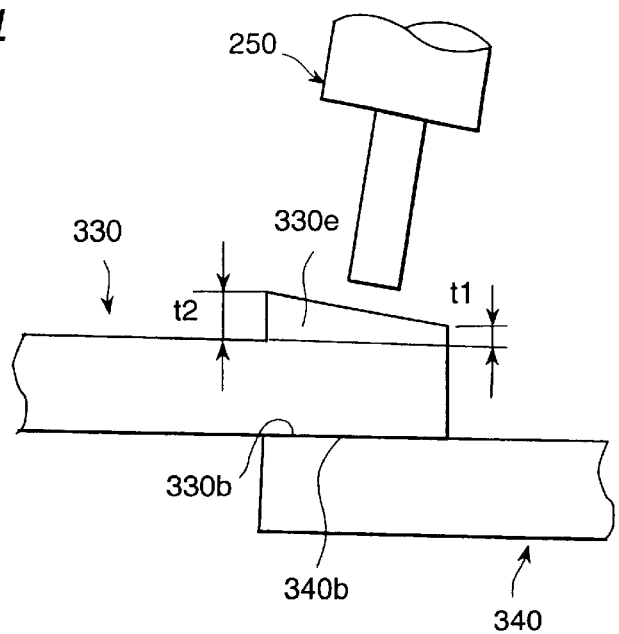
FIG. 14 is a cross-sectional view showing an essential portion of a joining portion of a further embodiment of a structural body and a manufacturing method according to the present invention.
Figure 15:
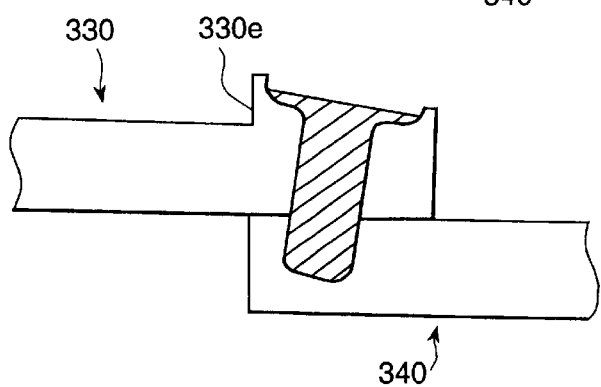
FIG. 15 is a cross-sectional view showing the state of the joint after the welding in FIG. 14.

A further embodiment shown in FIG. 14 and FIG. 15 will be explained. In this embodiment the end portions of the members 330 and 340 are overlapped. The members 330 and 340 are flat plates, except for the raised portion 330e on the member 330. The overlapping faces are horizontal, and the rotary tool 250 is inclined at an angle of four to ten degrees relative to the perpendicular. The inclination direction is from the end of the member 330 toward the end of the member 340. On the upper side of the member 330 into which the rotary tool 250 is inserted, the raised portion 330e is provided.

In the end portion of the member 330, the raised portion 330e has a thickness which varies from t1 to t2 from the extension line of the upper face of the plate portion, so that the upper surface of the raised portion 330e is inclined. The end of the plate portion and the end of the t1 portion of the raised portion 330e form an end surface which is substantially orthogonal relative to the upper surface of the plate portion. The end of the plate portion 330 and the end of the t1 portion of the raised portion 330e are positioned substantially on the same plane, and the upper face of the raised portion 330e is inclined. Namely, the upper face of the raised portion 330e is orthogonal to the axial center of the rotary tool 250. Accordingly, in the member 330, any unnecessary portion can be reduced. In FIG. 15, the welding bead shown in hatched lines is inclined.

A further embodiment of a structural body and a method of manufacture thereof according to the present invention will be explained with reference to FIG. 16.

Figure 16:
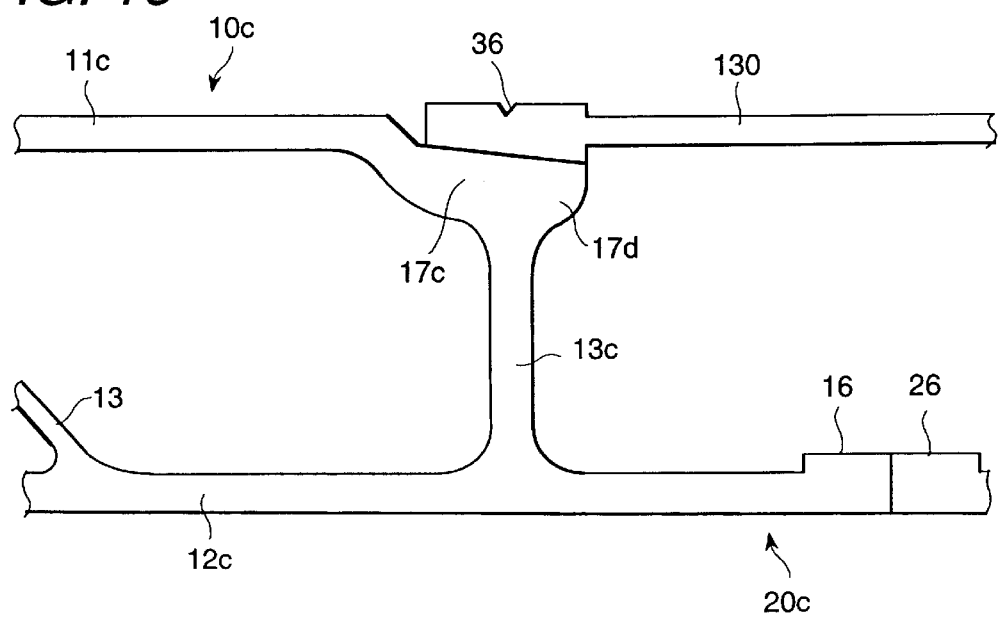
FIG. 16 is a longitudinal cross-sectional view showing an essential portion of a joining portion of a further embodiment of a structural body and a manufacturing method according to the present invention.

In FIG. 16, the rib 13C of the end portion of the hollow frame member 10c is orthogonal to the face plates 11c and 12c (along a normal line of the face plate). Overlapping surfaces of the hollow frame member 10c and the connecting member 130 are not positioned on a horizontal line, but are inclined, so that the overlapped portion is inclined at the axial center of the rotary tool 250. On the connection portion of the face plate 11c and the rib 13C, the recessed portion and the seat 17c are provide similar to the above-stated structure. A projection chip 17d is connected to the seat 17c, on which the end portion of the connection member 130 is mounted. The rotation center of the rotary tool 250 and the groove 36 are positioned within a range of the plate thickness of the rib 13C. With this structure, the insertion force during the friction stir welding is supported by the rib 13C.

What is claimed is:

1. A method of manufacturing a structural body comprising the steps of:
   preparing two hollow frame members in which two face plates are connected with a truss-shaped structure by plural ribs, an end portion of a corresponding one of said face plates on each member being positioned in the vicinity of an apex of said truss structure, and an end portion of the other of said face plates on each member having projections which extend beyond said end portion of said one of said face plates;
   joining said projections to each other from a side facing said one of said face plates;
   arranging a connection member between the end portion of said one of said face plates of each of said two hollow frame members; and
   joining respective end portions of said connection member to the respective ends of said one of said face plates of said two hollow frame members by friction stir welding.

2. A manufacturing method according to claim 1, wherein the step of joining said projections to each other from a side facing one of said face plates is carried out by friction stir welding.

3. A manufacturing method according to claim 2, further including:
overlapping respective end portions of said connection member with respective ends of said one of said face plates in the vicinity of an apex of the respective hollow frame members.

4. A method of manufacturing a structural body comprising the steps of:
preparing a first hollow frame member in which two face plates are connected with a truss-shaped structure by plural ribs, an end portion of one of said face plates being positioned in the vicinity of an apex of said truss structure, and an end portion of the other of said face plates having a projection which extends beyond said end portion of said one of said face plates;
preparing a second hollow frame member in which two face plates are connected with a truss-shaped structure by plural ribs, an end portion of one of said face plates being positioned in the vicinity of an apex of said truss structure, and an end portion of the other of said face plates having a projection which extends beyond said end portion of said one of said face plates, wherein one rib of each of said first hollow frame member and said second hollow frame member is connected to said one of said face plates in a vicinity of an apex of said truss structure and to said other of said face plates at a point midway of between an end portion of one of said face plates and to an end portion of the other of said face plates;
joining said end portion of said other face plate of said first hollow frame member to an end portion of said other face plate of said second hollow frame member from a side facing said one face plate of said first hollow frame member;
arranging a connection member between the end portion of said one face plate of said first hollow frame member and said end portion of said one face plate of said second hollow frame member; and
joining the respective end portions of said connection member to the respective face plates by friction stir welding.

5. A manufacturing method according to claim 4, wherein the step of joining said end portion of said other face plate of said first hollow frame member to said end portion of said other face plate of said second hollow frame member from a side facing said one of said face plates of said first hollow frame member is carried out by friction stir welding.

6. A manufacturing method according to claim 5, further including:
overlapping one end portion of said connection member in the vicinity of an apex of said first hollow frame member; and
overlapping another end portion of said connection member with a seat which is provided on said rib of said second hollow frame member.

7. A structural body, comprising:
two hollow frame members;
each of said two hollow frame members comprising two face plates connected with a truss-shaped structure by plural ribs, an end portion of one of said face plates of each frame member being provided in the vicinity of an apex of said truss structure, and an end portion of the other of said face plates of each frame member having projections which extend beyond said end portion of said one of said face plates; wherein
said projections are joined to each other; and
said end portion of said one of said face plates of one of said hollow frame members and said end portion of said other of said face plates of the one of said hollow frame members are joined through a connection member by friction stir welding respective end portions of said connection member to respective end portions of each of said one of said face plates.

8. A structural body according to claim 7, wherein
said connection member is provided on an extension line of said one of said face plates of said frame members.

9. A structural body according to claim 7, wherein
said projections are joined to each other using friction stir welding.

10. A structural body according to claim 7, wherein
respective end portions of said connection member are overlapped on a seat which is provided in the vicinity of said end portion of said one of said face plates of said frame members; and
respective end portions of said connection member are joined to said end portion of said one of said face plates of the respective hollow frame members.

11. A structural body according to claim 7, wherein
an inclination angle of a first rib of said end portion of at least one of said hollow frame members is smaller than an inclination angle of a second rib which is adjacent to first rib in said hollow frame member.

12. A structural body according to claim 7, wherein
a length of said connection member is the same as a pitch of said truss structure, except for a pitch or ribs of said truss-shaped structure immediately adjacent to said joining portion.

13. A structural body, comprising:
a first hollow frame member and a second hollow frame member;
said first hollow frame member comprising two face plates connected with a truss shape structure by plural ribs, an end portion of one of said face plates being provided in the vicinity of an apex of said truss structure, and an end portion of the other of said face plates having a projection which extends beyond said end portion of said one of said face plates;
said second hollow frame member comprising two face plates joined substantially by a rib which is orthogonal to said face plates, and said rib connects to said one of said face plates at the end portion of said one of said face plates and to said other of said face plates at a point midway between an end portion of one of said face plates and the an end portion of other of said face plates of said second hollow frame member;
end portions of said other of said face plates of said first hollow frame member and said other of said face plates of said second hollow frame member are joined to each other from a side facing said one of said face plates of said first hollow frame member; and
said end portion of said one of said face plates of said first hollow frame member and said end portion of said one of said face plates of said second hollow frame member are joined through a connection member by friction stir welding respective end portions of said connection member to respective end portions of each of said one of said face plates.

14. A structural body according to claim 13, wherein
said connection member is provided on an extension line of said one of said face plates of said first hollow frame member.

15. A structure body according to claim 13, wherein
wherein said end portions of said others of said face plates are joined by friction stir welding.

16. A structural body according to claim 13, wherein
respective end portions of said connection member are overlapped on a seat which is provided in the vicinity of said end portion of said face plates.

17. A structural body according to claim 13, wherein
an inclination angle of a first rib in said end portion of a hollow frame member is smaller than an inclination angle of a second rib which is adjacent to said first rib in said hollow frame member.

18. A method of manufacturing a structural body comprising the steps of:
connecting two face plates of each of two hollow frame members by plural ribs, and providing one of said two face plates of each of said two hollow frame members with an end portion having a projection extending beyond said end portion of the other of said two face plates;
joining said projections to each other from a side facing said other of said two face plates using friction stir welding; and
overlapping the respective end portions of one connection member on a connection portion which is disposed at one of said end portion and said rib of the other of said two face plates of one of said two hollow frame members and to a connection portion which is disposed at one of said end portion and said rib of the other of said two face plates of the other of said two hollow frame members; wherein
joining said one of said two hollow frame members and one end of said connection member at an overlapped end portion from an outer side of said hollow frame member by friction stir welding using a rotary tool, wherein an axis of the rotary tool is within said overlapped region; and
joining said other of said two frame members and the other end of said connection member at an overlapped end portion from an outer side of said hollow frame member using friction stir welding, or joining said other end of said connection member and said other end of said two face plates of said hollow frame member using arc welding.

19. A manufacturing method according to claim 18, wherein
the joining of said other of said two hollow frame members and the other end of said connection member is carried out by friction stir welding.

20. A manufacturing method according to claim 18, wherein
after the friction stir welding, said face plate which is adjacent to said end portion of said connection member is welded by arc welding.

21. A manufacturing method according to claim 18, wherein
in the joining of said other of said two hollow frame members and the other end of said connection member, said other end of said connection member of said face plate of said other of said hollow frame members are welded by arc welding, the arc welding being carried out after a friction stir welding of said one of said hollow frame members and said one end of said connection member.

22. A manufacturing method according to claim 18, wherein
said connection member has a groove at an outer face side of an end portion at which friction stir welding is carried out and said friction stir welding is carried out by judging the position of a rotary tool along said groove.

23. A method of manufacturing a structural body comprising the steps of:
connecting two face plates of each of two hollow frame members by plural ribs, and providing an end portion of one of said two face plates of each of said two hollow frame members with a projection which extends beyond an end portion of the other of said two face plates; and
joining said projections on said two hollow frame members to each other; wherein
overlapping the respective end portions of one connection member on a connection portion which is disposed at one of said end portion and said rib of the other of said two face plates of one of said two hollow frame members and to a connection portion which is disposed at one of said end portion and said rib of the other of said two face plates of the other of said two hollow frame members; wherein
joining said one of said two hollow frame members and one end of said connection member at an overlapped end portion from an outer side of said hollow frame member by friction stir welding using a rotary tool, wherein an axis of the rotary tool is within said overlapped region; and
joining said other of said two frame members and the other end of said connection member at an overlapped end portion from an outer side of said hollow frame member using friction stir welding, or joining said other end of said connection member and said other end of said two face plates of said hollow frame member by arc welding.

24. A manufacturing method according to claim 23, wherein
joining of said other of said two hollow frame members and the other end of said connection member is carried out by friction stir welding.

25. A manufacturing method according to claim 23, wherein
an end portion of said connection member which is adjacent to the friction stir welding is joined to said face plate by arc welding.

26. A hollow frame member to be joined to another member by friction stir welding, comprising:
two face plates connected with a truss-shaped structure by plural ribs;
an end portion of one of said two face plates being positioned in the vicinity of an apex of said truss structure of an end portion of the hollow frame member;
an end portion of the other of said two face plates having a projection extending from said end portion beyond said end portion of said one of said two face plates;
one rib of said plural ribs connecting said end portion of one of said two face plates and said end portion of said other of said two face plates;
a recessed shaped seat provided at a connection portion of said end portion of said one of said two face plates and one rib of said end portion, said recessed-shape seat opening in a direction away from said other of said two face plates of said hollow frame member and in a direction in which said end portion of said other of said two face plates projects; and a center portion of a width of said seat is positioned in the vicinity of said apex of said truss structure, wherein friction stir welding is to be carried out in the vicinity of said apex.

27. A friction stir welding hollow frame member according to claim 26, wherein the distance between said center portion of the width of said seat and an end portion of said hollow frame member is smaller than a distance between said center portion and said one of said two face plates.

28. A friction stir welded hollow frame member according to claim 26, wherein a connection portion from said seat to said one of said two face plates has an inclined face.

29. A structural body, comprising:

first and second members;

one end portion of said first member and another end portion of said second member being overlapped in an overlapped portion and welded by carrying friction stir welding in said overlapped portion;

wherein a bead of a welded joint is arranged in said overlapped portion; and wherein, when one face of said first member is positioned in a horizontal state, in a thickness direction of said overlapped portion, a center line of a width direction of said bead of said welded joint is inclined relative to said one face.

30. An extruded frame member to be connected to another member by friction stir welding, comprising:

two face plates connected by plural ribs;

an end portion of one of said two face plates being positioned in the vicinity of a rib of an end portion of said frame member;

an end portion of the other of said two face plates having a projection extending beyond said end portion of said one of said two face plates;

an outside face of said end portion of said one of said two face plates at a connection portion of said end portion of said one of said two face plates and said rib of said end portion of said frame member is inclined toward said end portion of said other of said face plates; and wherein friction stir welding is to be carried out at the inclined portion.

* * * * *